(12) United States Patent
Landon

(10) Patent No.: US 10,724,218 B1
(45) Date of Patent: Jul. 28, 2020

(54) DEVICES AND METHODS FOR OPTIMIZING FLOW THROUGH DRAINS

(71) Applicant: Green Drain Inc., Naples, FL (US)

(72) Inventor: Frank Landon, Santa Ana, CA (US)

(73) Assignee: GREEN DRAIN INC., Naples, FL (US)

( * ) Notice: Subject to any disclaimer, the term of this patent is extended or adjusted under 35 U.S.C. 154(b) by 0 days.

(21) Appl. No.: 16/244,557

(22) Filed: Jan. 10, 2019

(51) Int. Cl.
*E03C 1/26* (2006.01)
*E03F 5/042* (2006.01)
*F16K 15/14* (2006.01)

(52) U.S. Cl.
CPC .............. *E03C 1/26* (2013.01); *E03F 5/042* (2013.01); *F16K 15/148* (2013.01)

(58) Field of Classification Search
CPC ............ E03C 1/26; E03F 5/042; F16K 15/148
USPC .............................................................. 4/286
See application file for complete search history.

(56) References Cited

U.S. PATENT DOCUMENTS

| 4,088,149 A * | 5/1978 | Logsdon | ................ | E03F 5/042 137/433 |
| 2007/0215212 A1* | 9/2007 | Demeniuk | ............. | E03F 5/042 137/362 |

* cited by examiner

*Primary Examiner* — Christine J Skubinna
(74) *Attorney, Agent, or Firm* — Fish IP Law, LLP

(57) ABSTRACT

A drain insert is described that provides a valve that prevents backflow of objects and materials through the drain inlet and which has an internal wall with a convex curvature. This convex curvature, which can be elliptical, provides improved fluid flow rates relative to straight walled, cylindrical configurations, permitting small diameter drains to utilize the drain insert while meeting IAPMO flow rate requirements.

15 Claims, 8 Drawing Sheets

DEVICES AND METHODS FOR OPTIMIZING FLOW THROUGH DRAINS

FIELD OF THE INVENTION

The field of the invention is drain inserts, more specifically drain inserts that provide high fluid flow rates while preventing backflow.

BACKGROUND

The following description includes information that may be useful in understanding the present invention. It is not an admission that any of the information provided herein is prior art or relevant to the presently claimed invention, or that any publication specifically or implicitly referenced is prior art.

Drains are ubiquitous features in homes and businesses, providing removal of waste and excess water, typically to centralized sewage or gray water treatment systems. Unfortunately connection to such systems can provide a route for entry of unwanted contents of such systems to such homes and businesses. Such unwanted contents include waste water, untreated sewage, gases, and insect and/or rodent pests.

In order to prevent or reduce such occurrences various valve systems have been devised. Examples of such valve systems include U.S. Pat. Nos. 7,900,288, 9,027,172, and International Patent Application Publication No. WO 2017/091692. All publications identified herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

While such devices are effective in preventing unwanted intrusion and/or contamination via a drain the placement of such devices within the fluid flow path can potentially reduce the rate of fluid flow through the drain. This is particularly true when the drain is relatively narrow (e.g. less than about 2 inches/5.1 cm).

U.S. Pat. No. 8,627,519 describes a pool drain with an inlet and a sump, with blades positioned within the fluid path that direct the incoming water and provide laminar flow within the drain pipe. The stated purpose for these is to prevent or reduce entanglement of debris that enters the pool drain, thereby reducing the formation of blockages. It is not clear that these provide any improvement in flow rate through the drain. Similarly, United States Patent Application Publication No. 2018/0112407 describes the use of a drain cover for a roof drain inlet that includes an arrangement of fins that prevent the formation of a vortex by draining rainwater and the provide high volume laminar flow within the drain pipe. It is not apparent, however, if such a device can be adapted to conventional domestic or industrial use where projections from a drain cover may be susceptible to impact damage. In addition, it is not evident that such approaches are effective in relatively narrow diameter drains.

Thus, there is still a need for devices and methods that increase fluid flow rates through narrow drains, particularly in the presence of drain valve systems.

SUMMARY OF THE INVENTION

A drain insert is provided that provides placement of a valve that prevents flow of materials from the drain insert outlet to the drain insert inlet, while maintaining a high flow rate. This is achieved by providing an inner wall with a convex curvature, for example an elliptical curvature that extends towards the center of the drain insert. Such a drain insert is particularly useful in relatively narrow drains (e.g. less than 6 inches), such as those used in dwellings, and can provide such drains with backflow protection while maintaining fluid flow rates recommended by regulatory bodies.

One embodiment of the inventive concept is a drain insert that includes an inlet having an inlet aperture delimited by an inlet edge and an outlet aperture, where the inlet aperture and the outlet aperture define a fluid flow path through the drain insert having a length D. Such an insert includes an interior wall extending from the inlet edge to the outlet aperture and defining a central space or void through which fluid flows during operation, and a valve positioned within the central space or void. This interior wall extends centrally as a continuously curved convex surface extending from the inlet periphery towards the outlet aperture for at least 80% of D. Such a drain insert can be dimensioned to fit within a sink or floor drain. Such a drain insert can have an interior wall that has an inlet region extending from the inlet edge, an outlet region extending from the outlet aperture, and an intermediate region positioned between the inlet region and the outlet region, where the inlet region has a cross section corresponding to a portion of a first ellipse. In some embodiments the intermediate region has a cross section corresponding to a portion of a second ellipse. In such embodiments the first ellipse can have a first major diameter a and a first minor diameter b and the second ellipse can have a second major diameter c and a second major diameter d, wherein a/b is greater than c/d. In some embodiments the outlet region has a cross section corresponding to a portion of a third ellipse, where the third ellipse has a third major diameter e and third minor diameter f, where c/d is greater than e/f. The drain insert can include a supporting arm extending from the interior wall and coupled to the valve, which can be a skirt valve. Another embodiment of the inventive concept is a method of increasing fluid flow through a drain by placing a drain insert as described above into a drain or drain pipe.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIG. 1A depicts a cross section of such a drain insert in which the support arm is not visible, and shows detail of the convex curvature of the inner wall. FIG. 1B depicts a different cross section of such a drain insert in which the support arm for the valve assembly is shown extending from an interior wall of the drain insert. FIG. 1C depicts a top-down view of the drain insert, showing the central position of the valve assembly within the fluid flow path of the insert. FIG. 1D depicts a surface rendered cross section of the drain insert, and includes a depiction of a skirt valve in the valve assembly.

FIG. 2A depicts a cross section of such a drain insert in which the support arm is not visible, and shows detail of the convex curvature of the inner wall. FIG. 2B depicts a different cross section of such a drain insert in which the support arms for the valve assembly are shown extending from an interior wall of the drain insert. FIG. 2C depicts a top-down view of the drain insert, showing the central position of the valve assembly within the fluid flow path of the insert. FIG. 2D depicts a surface rendered cross section of the drain insert, and includes a depiction of a skirt valve in the valve assembly.

DETAILED DESCRIPTION

Figure 1A:
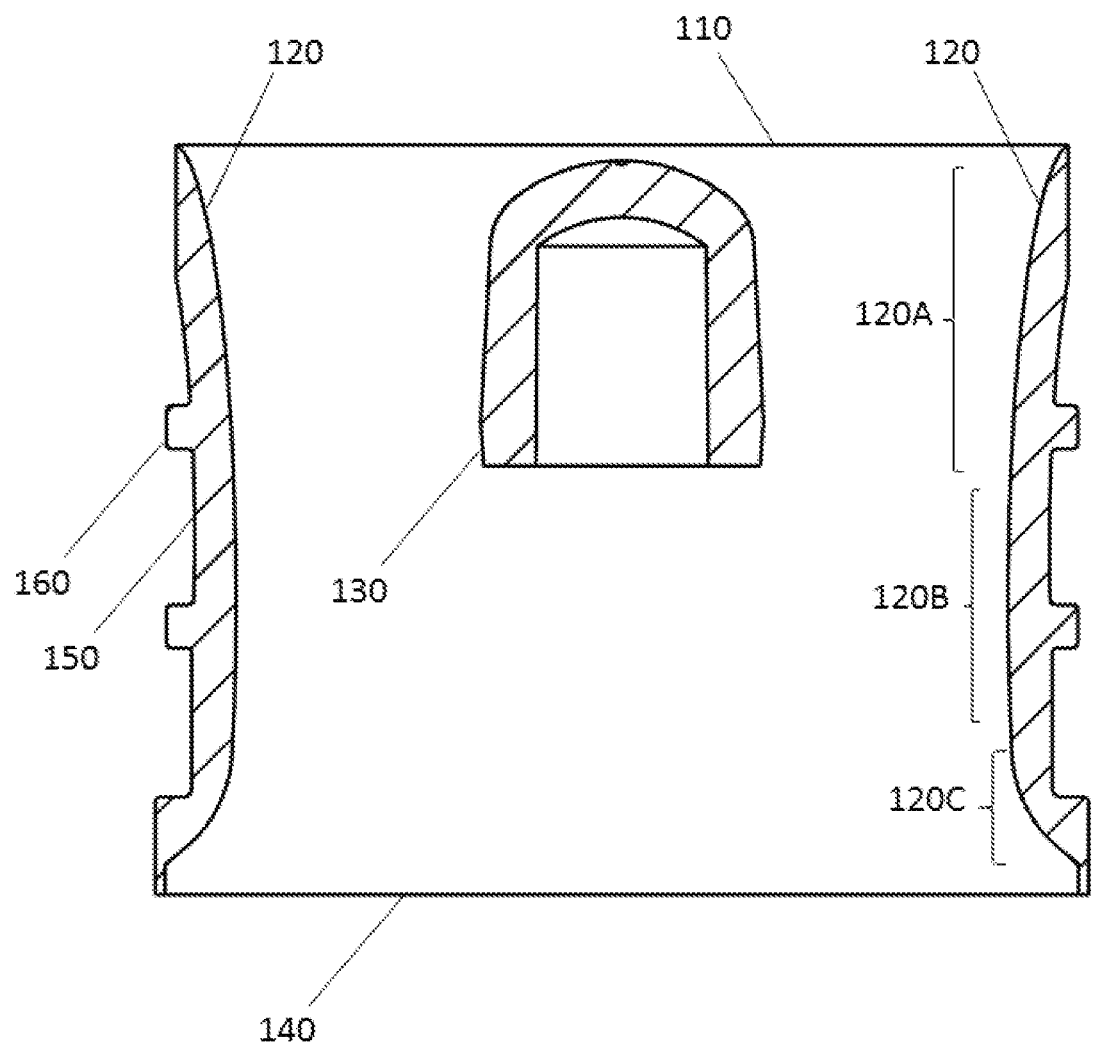
FIGS. 1A to 1D show different views of a drain insert of the inventive concept having a single supporting arm for a valve assembly. Depictions of the valve are not provided in FIGS. 1A to 1C in order to improve avoid obscuring other details, however it should be understood that such a valve is present in the drain insert.

The inventive subject matter provides a drain insert that includes at least one valve (such as a skirt valve) that prevents or reduces flow of fluids and/or gases up through the drain and includes a convex interior wall that projects in a centrally-facing curve through 80% or more of the length of the flow path through the insert. Surprisingly, while such a convex interior wall necessarily narrows the flow path through the drain insert, Inventors have found that flow rate through such an insert is increased relative to flow rate through a similar insert having conventional, straight walls. This permits relatively narrow drains fitted with such a valve insert to meet IAPMO flow rate standards. Drains in which such methods and devices are implemented can have a diameter between about 1 inch (2.5 cm) and about 6 inches (10 cm), and in preferred embodiments have a diameter of about 2.5 inches (6.4 cm) or less.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

The recitation of ranges of values herein is merely intended to serve as a shorthand method of referring individually to each separate value falling within the range. Unless otherwise indicated herein, each individual value with a range is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

One should appreciate that provide rapid and efficient drainage of excess or waste liquids through narrow drain pipes and/or drain pipes containing devices that prevent unwanted materials from exiting the drain. The device is advantageously applicable to relatively narrow (e.g. 2.5 inches/6.4 cm or less) drain systems commonly used in dwellings.

Drain inserts that include valves, such as skirt valves that contact the interior wall of the insert, have been used to prevent the unwanted movement of fluids (such as sewage, waste water, and/or sewer gas) and solids (including insect and rodent pests) up through drains. Inclusion of such a valve, however, can impact the rate of fluid flow through a drain so equipped. This is particularly true of relatively small (e.g. 2.5 inches/6.4 cm or less) drain openings and narrow diameter drain pipes used in dwellings. Unfortunately, in some instances this can lead to such drains failing to meet the fluid flow requirements set by organization such as the IAPMO.

Typically such drain inserts are essentially cylindrical, with a circular cross section and straight, linear walls and a valve placed within the flow path. This configuration maximizes the cross sectional area of the fluid flow path through the drain insert. Surprisingly, the Inventors have found that providing such a drain insert with convex walls that curve inward (i.e. centrally) through most (e.g. 80% or more) of the length of the flow path through the insert results in an increased flow rate relative to an otherwise corresponding cylindrical implementation of a valve insert. At least a portion of such a convex wall can have a cross section corresponding to a portion of an elongated ellipse. In some embodiments different portions of the convex wall can have cross sectional curvatures corresponding to portions of ellipses having different major axis:minor axis ratios. For example, an initial portion of the convex wall that begins at the drain opening can have a cross section corresponding to a relatively elongated ellipse (e.g. having a major axis:minor axis ratio of from about 20 to about 2), whereas an intermediate portion of the convex wall positioned approximately midway or further along in the fluid flow path can have a cross section corresponding to a portion of a less elongated ellipse (e.g. having a major axis:minor axis ratio of from about 15 to about 1.5), thereby providing a more pronounced curvature. In some embodiments another portion of the convex wall positioned downstream from the intermediate portion (e.g. terminating at the outlet aperture) can have a cross section corresponding to a portion of a still less elongated ellipse (e.g. having a major axis:minor axis ratio of from about 5 to about 1). In some embodiments one or more supports can extend from a portion of the interior wall to support a valve assembly within the flow path of the drain insert.

Without wishing to be bound by theory, the Inventor believes that such a convex interior wall serves to reduce the occurrence of turbulent flow and enhance laminar flow through the flow path of the insert, thereby improving the overall fluid flow rate despite reducing the diameter of the flow path relative to prior art designs. This improvement in fluid flow rate is sufficient to permit relatively small drain openings to meet IAPMO standards while providing protection from unwanted movement of materials up through the drain inlet.

Drain inserts of the inventive concept can be from about 6 inches (15.2 cm) to about 1 inch (2.5 cm) in diameter, or be dimensioned to fit within drains/drain pipes having such dimensions. Such drain inserts can be constructed of any suitable material, including stainless steel, aluminum, plastic, hardened rubber, and/or a resin composite. Drain inserts of the inventive concept can include features to facilitate placement within a drain or drain pipe, including external threads that mate with internal threads of the drain or drain pipe, deformable gaskets or O-rings, and/or an external taper.

As noted above, drain inserts of the inventive concept can include one or more valves positioned within the flow path of the drain insert and oriented so as to prevent flow or movement of materials from the outlet towards the inlet of the drain insert. Suitable valves include, but are not limited to, flap valves, disc valves, and skirt valves. Such valves can be constructed of any suitable material, including metal, ceramic, plastic, composite materials, natural rubber, and silicone rubber. In a preferred embodiment, a skirt valve is provided in a valve assembly placed centrally within the flow path of the drain insert and is dimensioned such that the outer perimeter of the skirt valve contacts the interior wall of the drain insert in the absence of fluid flow. In some embodiments such a valve assembly can include two or more skirt valves.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1B:
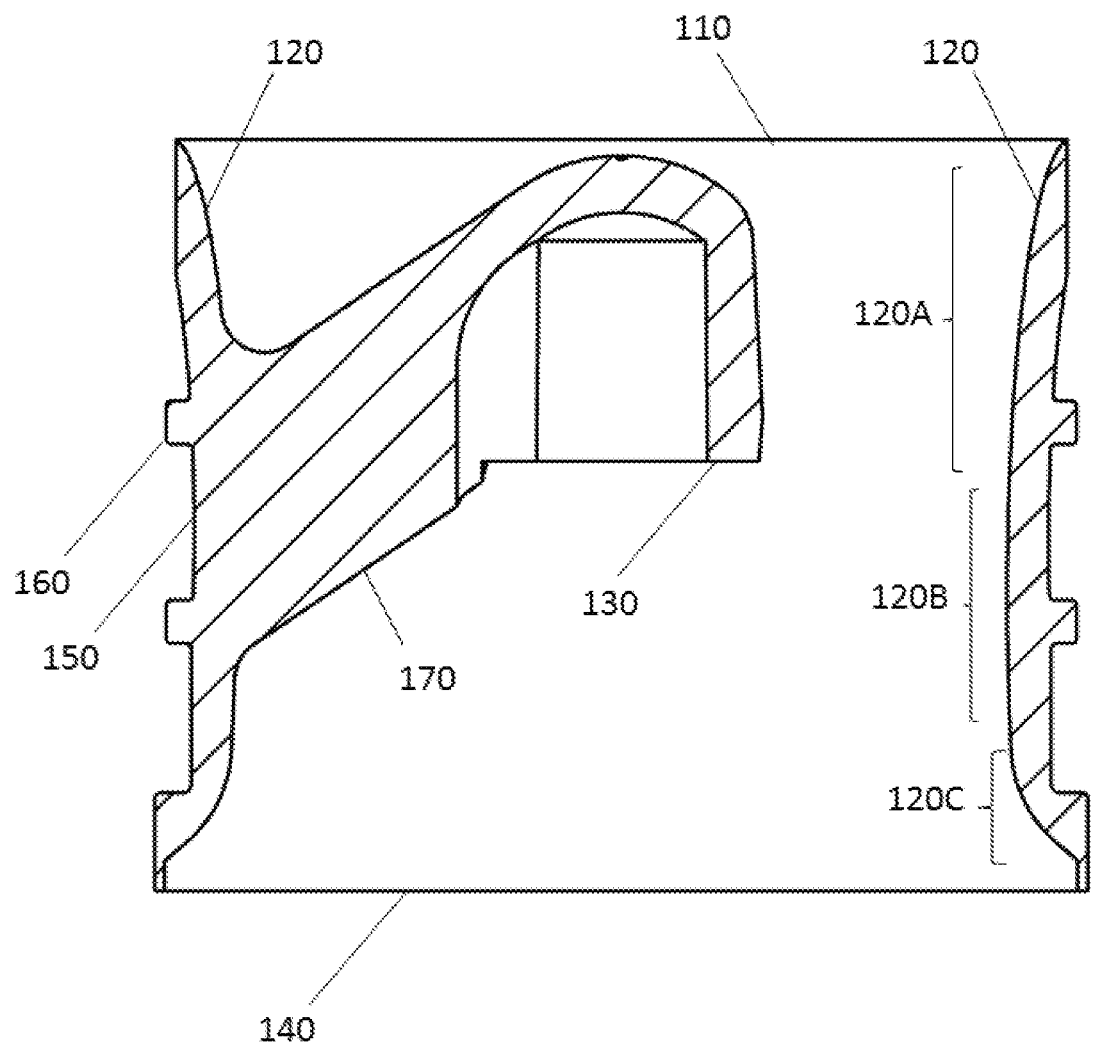
Figure 1C:
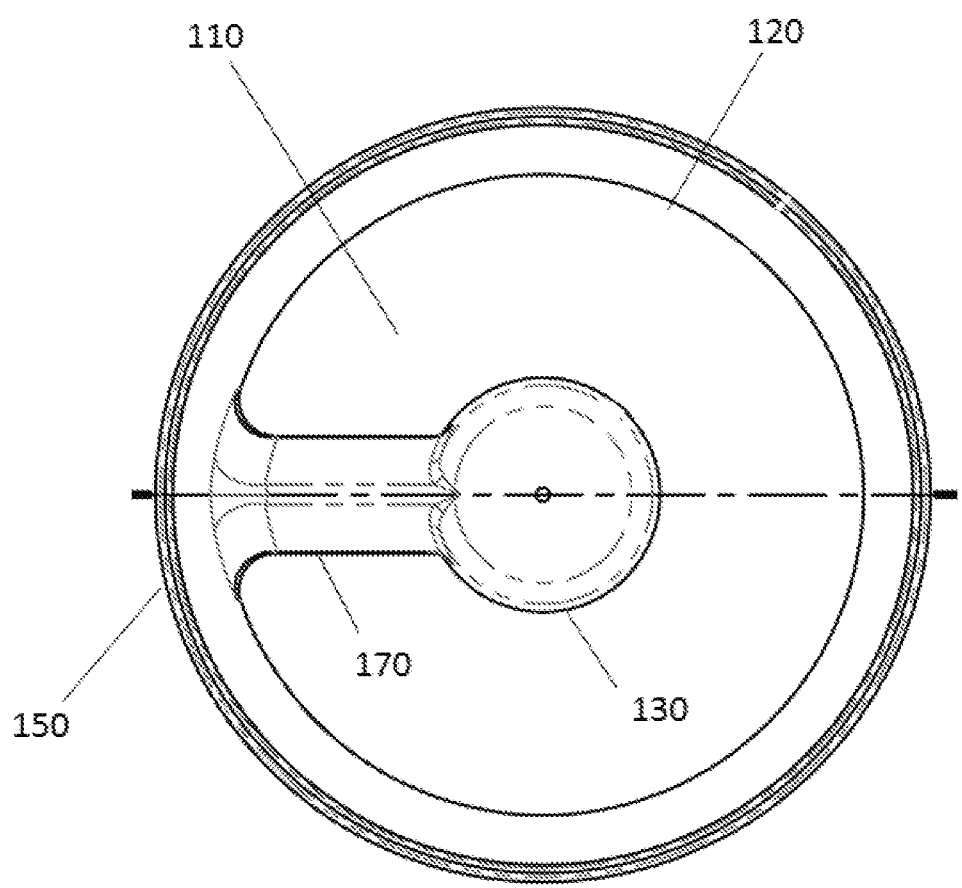
Figure 1D:
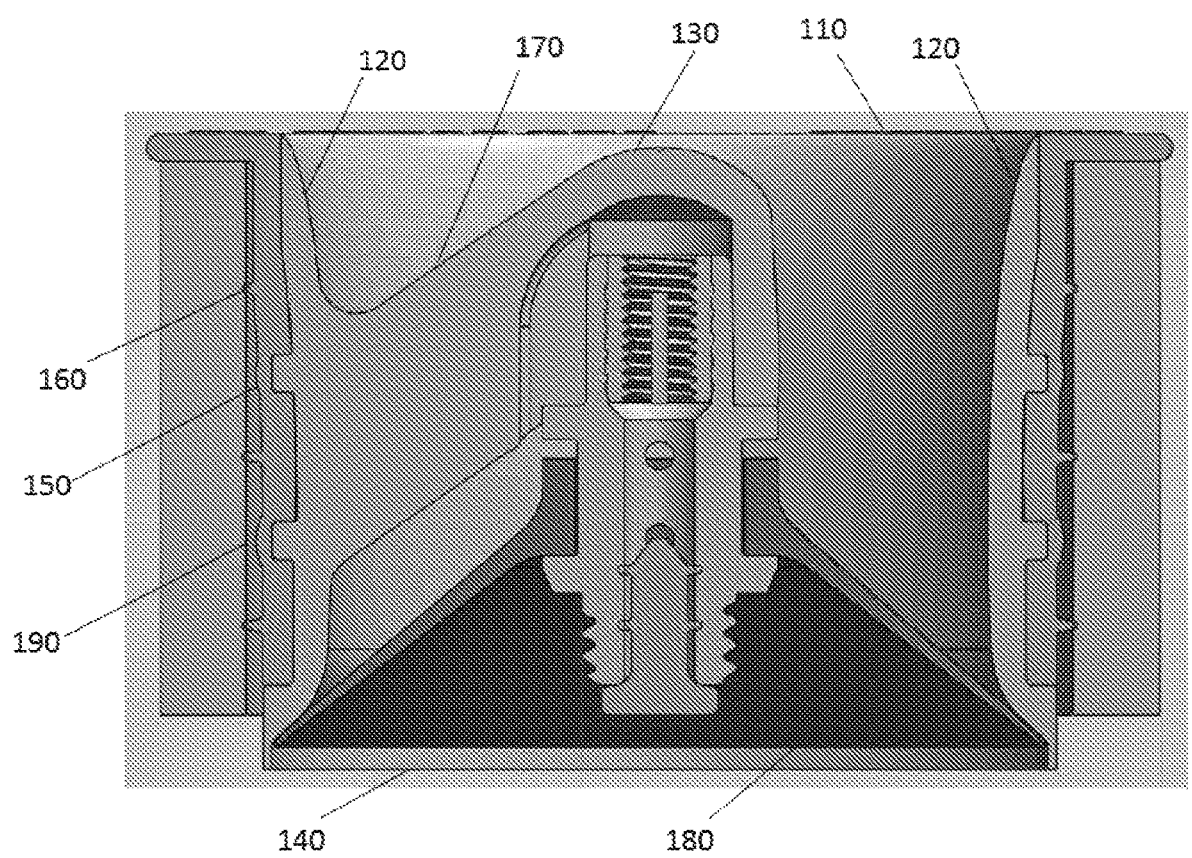

An exemplary embodiment of a drain insert of the inventive concept is shown in FIGS. 1A to 1D. FIG. 1A shows a cross section of an exemplary embodiment of a drain insert of the inventive concept. The insert has a drain inlet 110, a drain outlet 140 and a convex internal wall 120, with a continuously curved surface that projects centrally throughout most (e.g. about 80%) of the fluid flow path delimited by the drain inlet and outlet. As shown, a first portion 120A of the internal wall 120 can have a cross section that is represented by a portion of an elongated ellipse, for example an ellipse having a major axis:minor axis ratio ranging from about 20 to about 2. In some embodiments the internal wall 120 can have a second portion 120B positioned downstream from the first portion 120A, and which has a cross section that is represented by a portion of an elongated ellipse having a smaller major axis:minor axis ratio (for example ranging from about 15 to about 1.5). In such embodiments the internal wall 120 can have a third portion 120C positioned downstream from the second portion 120B, and which has cross section that is represented by a portion of an elongated ellipse having a still smaller major axis:minor axis ratio (for example, from about 5 to about 1). Such a drain insert can include a valve assembly that includes a valve support 130. The valve is not shown in this view in order to provide clarity for the description of the conformation of the interior wall 120. Drain inserts of the inventive concept include an external wall 150 dimensioned to fit within a drain inlet and/or drain pipe (for example a drain inlet or pipe having a diameter of from about 6 inches (15.2 cm) to about 1 inch (5.1 cm), which can include external threads 160 that are complementary to internal threads of the drain inlet and/or drain pipe. FIG. 1B depicts a different cross section of the drain insert of FIG. 1A, and additionally shows a valve support 170 extending from a portion of the interior wall 120 and connecting to the valve assembly 130. FIG. 1C depicts a top-down view of the drain insert of FIGS. 1A and 1B, showing the central placement of the valve assembly within the fluid flow path of the drain insert.

FIGS. 1A to 1C do not include a depiction of the drain insert valve in order to facilitate understanding of the curvature of the internal wall of the drain insert. Although not depicted in these views, in such an embodiment a skirt valve can be mounted within the valve support, and dimensioned such that the outer edge of the lower portion of the skirt valve contacts the interior wall 120 of the drain insert in the absence of fluid flow. Typical size and position of such a skirt valve 180 is shown in the surface-rendered cross section shown in FIG. 1D, which depicts the drain insert positioned within a drain inlet 190.

Figure 2A:
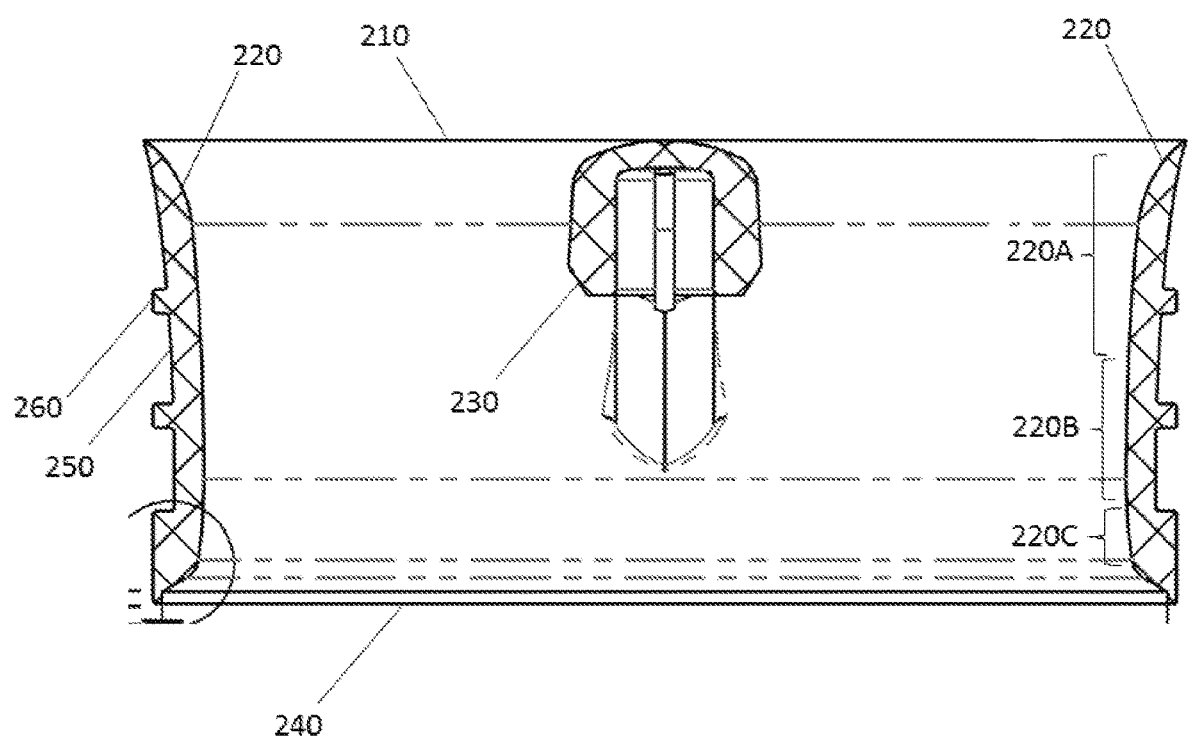
FIGS. 2A to 2D show different views of a drain insert of the inventive concept having a two supporting arms for a valve assembly, which may be more suitable for larger drains. Depictions of the valve are not provided in FIGS. 2A to 2C in order to improve avoid obscuring other details, however it should be understood that such a valve is present in the drain insert.
Figure 2B:
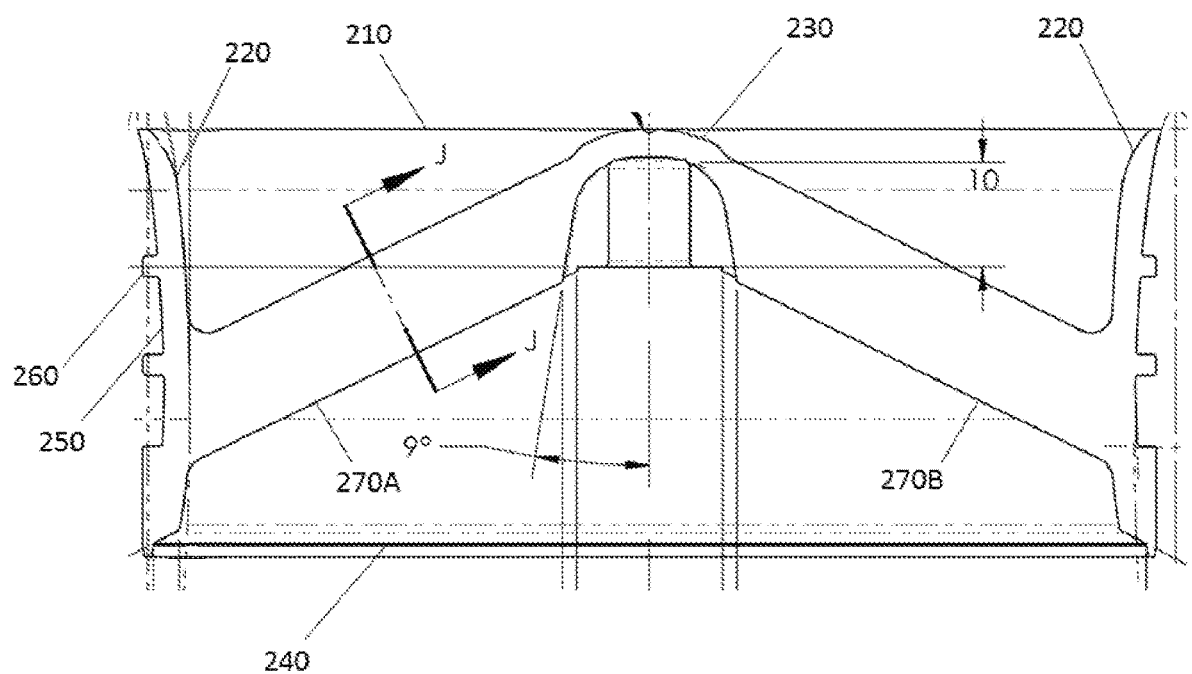
Figure 2C:
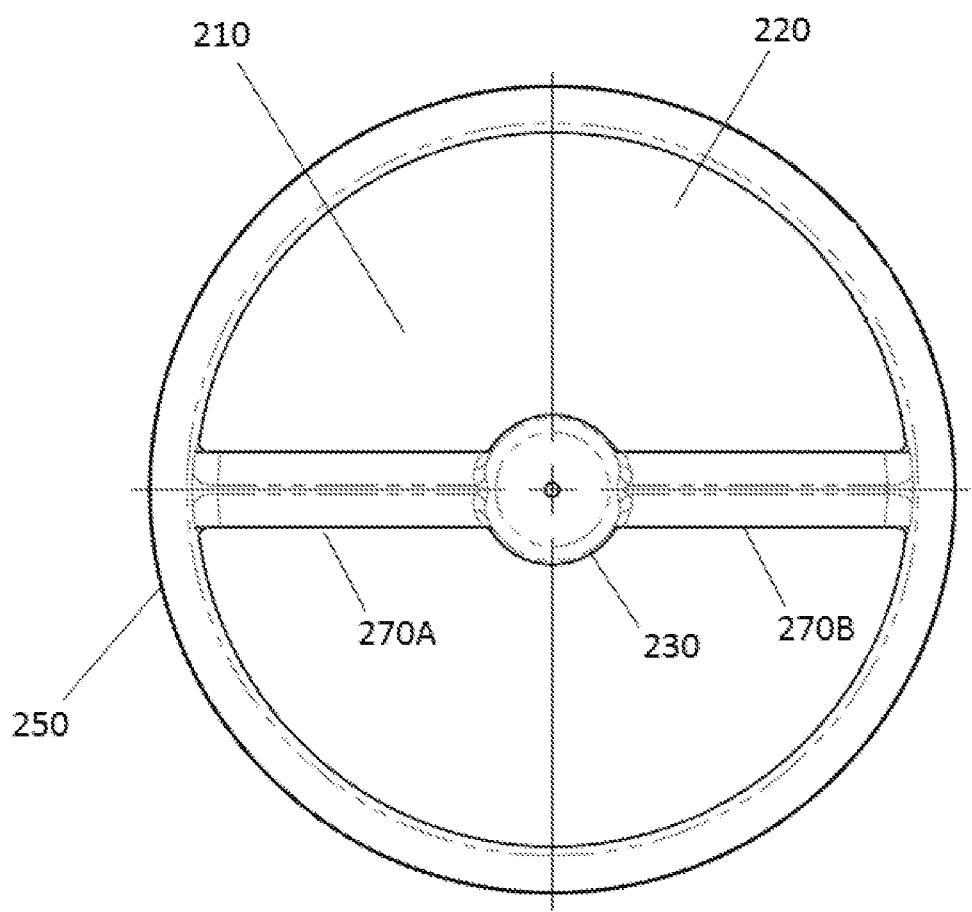

Another embodiment of a drain insert of the inventive concept is shown in FIGS. 2A to 2C, which may be suitable for larger drains. FIG. 2A shows a cross section of an exemplary embodiment of a drain insert of the inventive concept. The insert has a drain inlet 210, a drain outlet 240 and a convex internal wall 220, with a continuously curved surface that projects centrally throughout most (e.g. about 80%) of the fluid flow path delimited by the drain inlet and outlet. As shown, a first portion 220A of the internal wall 220 can have a cross section that is represented by a portion of an elongated ellipse, for example an ellipse having a major axis:minor axis ratio ranging from about 20 to about 2. In some embodiments the internal wall 220 can have a second portion 220B positioned downstream from the first portion 220A, and which has a cross section that is represented by a portion of an elongated ellipse having a smaller major axis:minor axis ratio (for example ranging from about 15 to about 1.5). In such embodiments the internal wall 220 can have a third portion 220C positioned downstream from the second portion 220B, and which has cross section that is represented by a portion of an elongated ellipse having a still smaller major axis:minor axis ratio (for example, from about 5 to about 1). Such a drain insert can include a valve assembly that includes a valve support 230. The valve is not shown in this view in order to provide clarity for the description of the conformation of the interior wall 220. Drain inserts of the inventive concept include an external wall 250 dimensioned to fit within a drain inlet and/or drain pipe (for example a drain inlet or pipe having a diameter of from about 6 inches (15.2 cm) to about 1 inch (5.1 cm), which can include external threads 260 that are complementary to internal threads of the drain inlet and/or drain pipe. FIG. 2B depicts a different cross section of the drain insert of FIG. 2A, and additionally shows two valve supports 270A, 270B extending from a portion of the interior wall 220 and connecting to the valve assembly 230. FIG. 2C depicts a top-down view of the drain insert of FIGS. 2A and 2B, showing the central placement of the valve assembly within the fluid flow path of the drain insert.

Figure 2D:
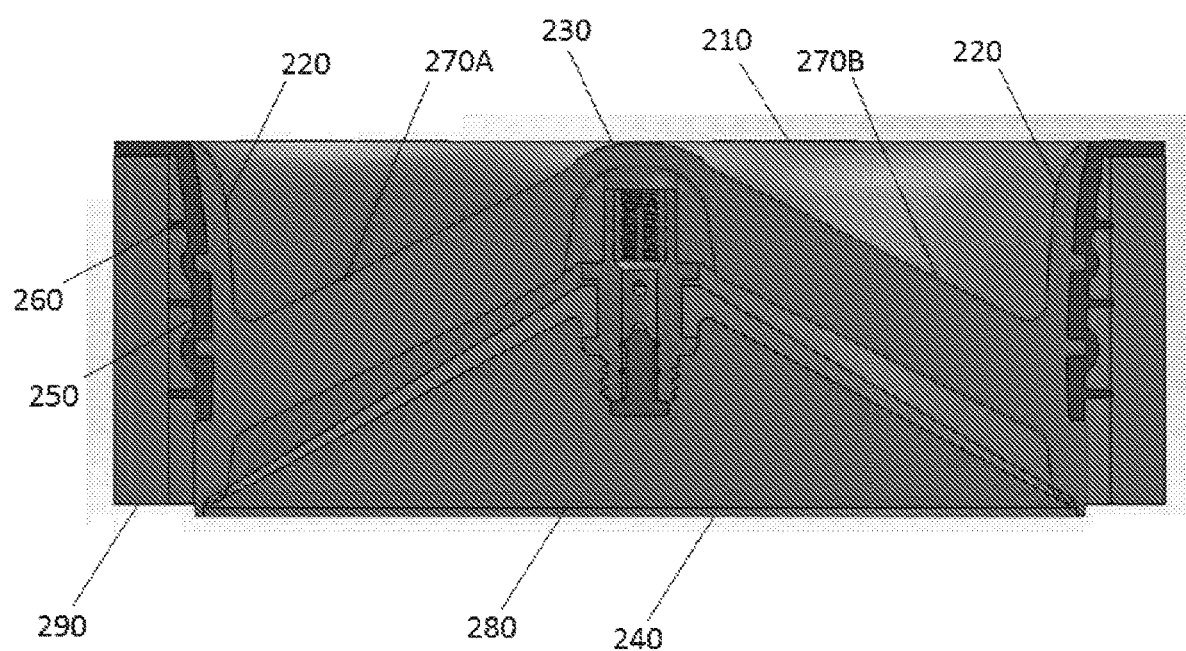

FIGS. 2A to 2C do not include a depiction of the drain insert valve in order to facilitate understanding of the curvature of the internal wall of the drain insert. Although not depicted in these views, in such an embodiment a skirt valve can be mounted within the valve support, and dimensioned such that the outer edge of the lower portion of the skirt valve contacts the interior wall 220 of the drain insert in the absence of fluid flow. Typical size and position of such a skirt valve 280 is shown in the surface-rendered cross section shown in FIG. 2D, which depicts the drain insert positioned within a drain inlet 290.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A drain insert comprising:
    an inlet comprising an inlet aperture delimited by an inlet edge;
    an outlet aperture, wherein the inlet aperture and the outlet aperture define a fluid flow path through the drain insert having a length D;
    an interior wall extending from the inlet edge to the outlet aperture and defining a central void; and
    a valve positioned within the central void,
    wherein the interior wall extends centrally as a continuously curved convex surface extending from the inlet periphery towards the outlet aperture for at least 80% of D.

2. The drain insert of claim 1, wherein the drain insert is dimensioned to fit within a sink or floor drain.

3. The drain insert of claim 1, wherein the interior wall comprises an inlet region extending from the inlet edge, an outlet region extending from the outlet aperture, and an intermediate region interposed between the inlet region and the outlet region, wherein the inlet region has a cross section corresponding to a portion of a first ellipse.

4. The drain insert of claim 3, wherein the intermediate region has a cross section corresponding to a portion of a second ellipse.

5. The drain insert of claim 4, wherein the first ellipse comprises a first major diameter a and a first minor diameter b and the second ellipse comprises a second major diameter c and a second major diameter d, wherein a/b is greater than c/d.

6. The drain insert of claim 5, wherein the outlet region has a cross section corresponding to a portion of a third ellipse, wherein the third ellipse comprises a third major diameter e and third minor diameter f, and wherein c/d is greater than e/f.

7. The drain insert of claim 1, further comprising a supporting arm extending from the interior wall and coupled to the valve.

8. The drain insert of claim 1, wherein the valve is a skirt valve oriented to reduce or prevent fluid flow from the outlet aperture towards the inlet aperture.

9. A method of increasing fluid flow through a drain, comprising:
    providing a drain insert comprising an inlet comprising an inlet aperture delimited by an inlet edge, an outlet aperture positioned at a distance D from the inlet aperture, an interior wall extending from the inlet edge to the outlet aperture and defining a central void, and a valve positioned within the central void, wherein the interior wall extends centrally as a continuously curved convex surface extending from the inlet periphery towards the outlet aperture for at least 80% of D; and
    inserting the drain insert into the drain.

10. The method of claim 9, wherein the drain insert comprises a first threading configured to mate with a second threading of the drain.

11. The method of claim 9, wherein the interior wall comprises an inlet region extending from the inlet edge, an outlet region extending from the outlet aperture, and an intermediate region interposed between the inlet region and the outlet region, wherein the inlet region has a cross section corresponding to a portion of a first ellipse.

12. The method of claim 11, wherein the intermediate region has a cross section corresponding to a portion of a second ellipse.

13. The method of claim 12, wherein the first ellipse comprises a first major diameter a and a first minor diameter b and the second ellipse comprises a second major diameter c and a second major diameter d, wherein a/b is greater than c/d.

14. The method of claim 13, wherein the outlet region has a cross section corresponding to a portion of a third ellipse, wherein the third ellipse comprises a third major diameter e and third minor diameter f, and wherein c/d is greater than e/f.

15. The method of claim 9, wherein the valve is a skirt valve oriented to reduce or prevent fluid flow from the outlet aperture towards the inlet aperture.

* * * * *